United States Patent [19]

Sasaki et al.

[11] Patent Number: 4,950,736

[45] Date of Patent: Aug. 21, 1990

[54] POLYCARBONATE OR POLYESTERCARBONATE RESIN FROM BICYCLOL POLYCYCLO DIMETHANOL

[75] Inventors: Shigeru Sasaki; Mitsuo Matsumoto, both of Kurashiki, Japan

[73] Assignee: Kuraray Company, Ltd., Okayama, Japan

[21] Appl. No.: 401,014

[22] Filed: Aug. 31, 1989

[30] Foreign Application Priority Data

Sep. 2, 1988 [JP] Japan ................................ 63-220994
Sep. 2, 1988 [JP] Japan ................................ 63-220995
Feb. 16, 1989 [JP] Japan ................................ 1-37785

[51] Int. Cl.$^5$ ..................... C08G 64/02; C08G 64/16
[52] U.S. Cl. ..................................... 528/370; 528/190; 528/195; 528/201; 528/298

[58] Field of Search ............... 528/370, 201, 298, 190, 528/195

[56] References Cited

U.S. PATENT DOCUMENTS 4,506,066  3/1985  Medem et al. ...................... 528/370
4,855,380  8/1989  Hawkins et al. .................... 528/370

Primary Examiner—Harold D. Anderson
Attorney, Agent, or Firm—Oblon, Spivak, McClelland, Maier & Neustadt

[57] ABSTRACT

Provided are novel polycarbonate or polyestercarbonate resins having excellent performances including excellent transparency and thermal resistance, very small warping or deformation caused by water absorption, and the like.

11 Claims, 2 Drawing Sheets

POLYCARBONATE OR POLYESTERCARBONATE RESIN FROM BICYCLOL POLYCYCLO DIMETHANOL

BACKGROUND OF THE INVENTION

1. Field of the Invention

This invention relates to polycarbonate or polyestercarbonate resins.

2. Description of Prior Arts

Recently, transparent resins being excellent in various characteristics are required as materials for shaped articles in a wide variety of fields such as optical devices and automobile parts. In particular, in optical recording media such as optical disks and optical memory cards, new systems where users can record information have appeared, such as write-once system and re-writable system, and with development of such recording systems the level of requirement for various characteristics of substrate materials have been enhancing. Three characteristics are particularly required, namely low water absorption (small warping caused by water absorption), low birefringence and high thermal resistance. Glass and plastics are currently used as materials for the substrates. Since glass substrates have drawbacks of low mass-productivity, being expensive and heavy, and breaking readily, plastic materials, which do not have the drawbacks of glass, are mainly used for the substrates. Also for other optical elements, e.g. lenses such as concave/convex lenses and Fresnel lens, diffraction gratings, etc., plastic materials are going to be the main stream for the same reasons as those in the case of optical recording media.

Poly(methyl methacrylate) (hereinafter referred to as PMMA) and bisphenol A polycarbonate (hereinafter referred to as PC) are currently used as the transparent optical materials. Although PMMA has very low birefringence, it has drawbacks of having high water (moisture) absorption property and warping or deforming by water absorption, resulting in a decrease in its optical characteristics. In particular, when PMMA is used as the material for optical recording media composed of a single substrate, such as digital audio disks, accurate reproduction of the recorded signals is often impossible. Furthermore, optical recording media comprising FMMA as the substrate material have some problem in thermal resistance. On the other hand, PC has low water absorption property, warps only little and has no problem in thermal resistance, but it has a serious drawback that its birefringence is large. The birefringence of digital audio disks or small-diameter lenses can be suppressed within the required level under extremely careful molding conditions. However, the large-size optical elements such as laser-vision disks having a diameter of 30 cm or large-diameter lenses with the minimized birefringence cannot be produced even under such extremely careful molding conditions.

It has been reported that the glass transition temperatures of polyesters having norbornane skeleton, perhydrodimethanonaphthalene skeleton and perhydrotrimethanoanthracene skeleton are higher in the order listed, and that they are higher than those of polyesters having no such skeletons [cf. Journal of Polymer Science: Polymer Chemistry Edition, 10, p.3191 (1972)]. It is also known that the polyesters having the above-mentioned skeletons are excellent in dimensional stability and are used as supports for photographic elements (cf. U.S. Defensive Publication No. 896,033).

An object of the present invention is to provide a novel polycarbonate or polyestercarbonate resin having excellent transparency and thermal resistance, and having little warp or deformation caused by water absorption.

Another object of the present invention is to provide a novel polycarbonate or polyestercarbonate resin having excellent transparency, thermal resistance and resistance to high temperature and high humidity, and having little warp or deformation caused by water absorption.

Still another object of the present invention is to provide a novel polycarbonate or polyestercarbonate resin having a high glass transition temperature and thermal resistance, being little sensitive to birefringence, having excellent transparency, and having little warp or deformation caused by water absorption.

These objects as well as other objects and advantages of the present invention will become apparent to those skilled in the art from the following detailed description.

SUMMARY OF THE INVENTION

The present invention provides a polycarbonate or polyestercarbonate resin having a number average molecular weight of 10,000 to 1,000,000 and comprising structural units represented by the following formulae (I), (IV) and (V) or comprising these units and structural units represented by the following formula (II) or (III), the molar fraction of the structural unit (I) or the sum of molar fractions of the structural unit (I) and the structural unit (II) of (III) being substantially the same as the sum of molar fractions of the structural units (Iv) and (V), the molar fraction of the structural unit (II) or (III) being 5 to 45 mol % and the molar fraction of the structural unit (IV) being 20 to 50 mol %:

wherein n is 0, 1 or 2,

-continued
wherein A is an alkyl group or a phenyl group, (IV)

and (V)

wherein B is a divalent saturated aliphatic hydrocarbon group, saturated alicyclic hydrocarbon group or aromatic hydrocarbon group.

The present invention further provides a polycarbonate or polyestercarbonate resin having a number average molecular weight of 10,000 to 100,000 and comprising structural units represented by the above formulae (I), (IV) and (V), the molar fraction of the structural unit (I) being substantially the same as the sum of molar fractions of the structural units (IV) and (V), and the molar fraction of the structural unit (IV) being 20 to 50 mol %.

The present invention still further provides a polycarbonate resin having a number average molecular weight of 10,000 to 100,000 and comprising structural units represented by the above formulae (I), (II) and (IV), the sum of molar fractions of the structural units (I) and (II) being substantially the same as the molar fraction of the structural unit (IV), and the molar fraction of the structural unit (II) being 5 to 45 mol %.

The present invention still further provides a polycarbonate or polyestercarbonate resin having a number average molecular weight of 10,000 to 100,000 and comprising structural units represented by the above formulae (I), (III), (IV) and (V), the sum of molar fractions of the structural units (I) and (III) being substantially the same as the sum of molar fractions of the structural units (IV) and (V), the molar fraction of the structural unit (III) being 5 to 45 mol % and the molar fraction of the structural unit (IV) being 20 to 50 mol %.

BRIEF DESCRIPTION OF THE DRAWINGS

A more complete appreciation of the invention and many of the attendant advantages thereof will be readily obtained as the same become better understood by reference to the following detailed description when considered in connection with the accompanying drawings, wherein.

DESCRIPTION OF THE PREFERRED EMBODIMENTS

The above-described structural units are now described in detail.

While n is 0, 1 or 2 in structural unit (I), it is preferred that n be 1 or 2, since the thermal resistance of a resin is higher and its water absorption property is lower with a higher n. On the other hand, from the viewpoint of manufacturing cost of starting material dihydroxyl compounds, n is preferred to be smaller. On the balance of the performance and the manufacturing cost of the resin to be obtained, it is most preferred that n be 1.

Structural unit (I) is derived from the corresponding dihydroxyl compound, and the molar fraction, x, is (50−y) mol % or (50−z) mol % wherein the molar fractions of structural units (11) and (III) are y and z respectively.

Structural unit (II) is derived from 2,2,4,4-tetramethyl-1,3-cyclobutanediol. Resins having a molar fraction of structural unit (II) of 5 to 45 mol % give shaped articles having improved mechanical properties as compared with resins which do not comprise structural unit (II). Resins having a molar fraction of structural unit (II) exceeding 45 mol % give shaped articles having a higher water absorption property and birefringence than those obtained from resins with the molar fraction of not more than 45 mol %. The molar fraction of structural unit (II) is preferably in a range of 10 to 40 mol %.

The alkyl groups represented by A in structural unit (III) are preferably lower alkyl groups having 1 to 4 carbon atoms, which are exemplified by methyl, ethyl, n-propyl, iso-propyl, n-butyl and the like groups. Particularly preferred is the case where A is methyl, ethyl or phenyl group, and the most preferred is the case where A is methyl or phenyl group.

Structural unit (III) is derived from the corresponding dihydroxyl compound. Resins having a molar fraction of structural unit (III) of 5 to 45 mol % give shaped articles having improved thermal resistance as compared with resins which do not comprise structural unit (III). Resins having a molar fraction of structural unit (III) exceeding 45 mol % have higher optical anisotropy and, besides, low flow characteristics in melt to thereby become unsatisfactory in processability. The molar fraction of structural unit (III) is preferably in a range of 5 to 35 mol %, and more preferably in a range of 5 to 25 mol %.

Structural unit (IV) binds with structural unit (I), (II) or (III) by a carbonate bond. This structural unit is generally derived from a compound represented by the general formula (VI)

(VI)

wherein D is for example a phenyl group, an alkyl group or an alicyclic group; or from phosgene. Preferably it is derived from diphenyl carbonate from the viewpoint of ease of the manufacturing. In the resins of the present invention, the molar fraction, v, of structural unit (IV) is within the range of 20 to 50 mol %, and preferably within the range of 25 to 50 mol %, more preferably within the range of 30 to 50 mol %. If v is less than 20 mol %, the resin will have a high water absorption property, which is not preferred.

Structural unit (V) binds with structural unit (I), (II) or (III) by an ester bond. This structural unit is generally derived from a compound represented by the general formula (VII)

(VII)

wherein E is a hydroxyl group, a chlorine atom, a phenoxy group, an alkoxyl group or a cycloalkoxyl group, and B is as defined before. It is preferred that E be a phenoxy group or an alkoxyl group or cycloalkoxyl group having not more than 8 carbon atoms from the viewpoint of ease of polymerization. The molar fraction, w, of structural unit (V) is (50−v) mol %.

Preferably, B in structural unit (V) is a divalent saturated aliphatic hydrocarbon group having 1 to 20 carbon atoms, a divalent saturated alicyclic hydrocarbon group having 3 to 20 carbon atoms or a divalent aromatic hydrocarbon group having 6 to 20 carbon atoms, and more preferably a divalent saturated aliphatic hydrocarbon group having 1 to 12 carbon atoms, a divalent saturated alicyclic hydrocarbon group having 4 to 15 carbon atoms or a divalent aromatic hydrocarbon group having 6 to 12 carbon atoms.

Suitable examples of structural unit (V) are shown below.

(i) Where B is a divalent saturated aliphatic hydrocarbon group:

(ii) Where B is a divalent saturated alicyclic hydrocarbon group:

(iii) Where B is a divalent aromatic hydrocarbon group:

Among the above-mentioned structural units (V), particularly, the following structural units give the resins of the present invention with excellent thermal resistance:

-continued and

The following structural units give the resins with the most excellent thermal resistance:

and

Here, in the field where extremely low birefringence is requires such as magnetooptical recording media, etc., the use of a structural unit (V) belonging to the above group (iii) should be limited within an appropriate range.

Structural units (I), (III) and (V) may be present in the resins of the present invention either singly or in admixtures of 2 or more. Small amounts of any optional other structural units may also be incorporated within limits not to impair the characteristics of the resins of the present invention.

If the above structural unit (III) is replaced by the other structural unit, e.g. structural unit derived from bisphenol A, no resins with excellent thermal resistance and low birefringence will be obtained.

The resins of the present invention have a number average molecular Weight determined by gel permeation chromatography (GPC) of 10,000 to 100,000 (relative to standard polystyrene). The number average molecular weight of the resins of the present invention is preferably within the range of from 15,000 to 80,000, and more preferably within the range of from 15,000 to 50,000. The shaped articles from resins with the number average molecular weight of less than 10,000 are brittle and inferior in mechanical strength. On the other hand resins with a number average molecular weight exceeding 100,000 are not only difficult to produce but low in processability, which are not preferred.

The resins of the present invention can be produced by known processes. The known processes are ones conducting condensation reaction of a mixture of diphenyl carbonate, diphenyl ester of dicarboxylic acid and diol; condensation reaction of a mixture of dialkyl carbonate, dialkyl ester of dicarboxylic acid and diol; condensation reaction of phosgene, dicarboxylic acid chloride and diol; condensation reaction of phosgene, dicarboxylic acid chloride and alkali metal salt of diol; and the like reactions in the presence of, as required, an appropriate catalyst. The reactions can be conducted according to various processes such as melt polymerization and solution polymerization depending on the type of the reaction but, melt polymerization is preferred from the viewpoint of processability.

Hereinbelow explanations will be given on the case where the resins of the present invention are produced by melt process. As a catalyst, it is preferred to use a lithium metal or a lithium compound such as lithium hydride, lithium nitride, lithium hydroxide or a lithium alkoxide, e.g. lithium ethoxide, lithium butoxide, etc. which accelerates well the reaction. Such catalysts are generally used in an amount of 0.0001 to 1 mol % based on the total moles of the starting compounds, and preferably in an amount of 0.001 to 0.1 mol % on the same basis. If the amount of the catalyst used is smaller than the above range, the reaction rates will extremely decrease; while the amount is larger than the above range, the water absorption property of the resin obtained will increase. Polycondensation reaction is conducted by heating starting compounds with stirring in the presence of a catalyst under an atmosphere of inert gas such as nitrogen, argon or carbon dioxide and distilling off the alcohol or phenol which generates. The reaction temperature varies depending on the type of starting compounds, the boiling point of the alcohol or phenol which generates and the reaction rate required but, it is generally in the range of from 150° to 300° C. At the latter part of the reaction, the system is as required depressurized to promote the reaction. The pressure is within the range of from 0.001 to 100 mmHg. After completion of the reaction, the resin formed is extruded from the reactor into a strand, which is then pelletized, or the resin is taken out from the reactor as a block, which is then granulated. The thus obtained resin may further be subjected to solid phase polymerization.

The resins of the present invention can also be produced by first producing separately a resin comprising structural units (I), (IV) and (V) and a resin comprising structural unit (II) or (III) and structural units (IV) and (V), and then melting and mixing the two resins in such amounts that the molar fractions of structural units (I), (II), (III), (IV) and (V) will meet the conditions specified by the present invention.

The resins of the present invention have the following three features ① to ③:

① have high thermal resistance, the glass transition temperature being at least 110° C., ② are highly transparent, the light transmittance being at least 80% (2 mm thick) in the wave length range of 400 to 800 nm, and ③ have low water absorption at saturation of not more than 0.4%, and the warp or deformation caused by water absorption is very little.

Majority of the resins of the present invention have the following features ④ to ⑥:

④ are highly weather-resistant, having a flexural strength retention and light transmittance retention after being kept at 75° C., 85% RH for 200 hours of at least 90% and 100% respectively, ⑤ are of low birefringence, the photoelastic coefficient, which is an index of birefringence, being not more than $40 \times 10^{-13}$ cm$^2$/dyne in absolute value, and ⑥ have high surface hardness of at least 2H.

The resins of the present invention can be formed into shaped articles by any known melt molding process, such as press molding, extrusion molding, injection molding, injection compression molding, or the like. The resins of the present invention can also be formed into films by casting process. In the case of melt molding process, the resin temperature and the die temperature are generally set at 200 to 350° C. and 40° to 150° C. respectively. When the resin of the present invention is molded, a heat stabilizer, a light stabilizer, an antistatic agent, a lubricant, an inorganic or organic filler, a dye, a pigment or the like may as required be added to the resin.

Flat plates or the like simple-shape articles formed from the resins of the present invention may further be laminated with an inorganic or organic material, be formed into more complex shapes by adhesion or fusion, or be higher-order processed by for example embossing on the surface.

In the case where the resins of the present invention are used as materials for substrates of read-only optical recording media, the resins are first molded by injection or the like molding using dies which have grooves, signals or the like to give such substrates. A layer of aluminum or the like metals is formed by vacuum deposition or the like process on the recording surface of the substrates thus obtained, and the layer is further covered with a protective polymer layer, or a pair of such substrates each having the recording surface carrying the metal thereon are patched together such that the two recording surfaces meet.

Information recording layers may be provided on the flat substrates comprising the resins of the present invention also by 2P process using photosetting resins. The information recording layers may also be formed by providing a thin layer of an inorganic substance such as tellurium oxide or terbium-iron-cobalt alloy, or an organic substance such as cyanine dye on the surfaces of the shaped articles.

The resins of the present invention can be used, making the most of the above-described superior features, for uses as listed below.

① Parts for lighting fixtures

② Various signboards

③ Substitutes for glass in the field of windows, windshields, etc.

④ Substrates for display elements such as liquid crystal display

⑤ Various lenses including convex/concave lenses used for eyeglass, camera, loupe, videoprojector, etc., Fresnel lens and the like ⑥ Diffraction gratings for the pick-ups of optical disk players, spectroscopy elements, optical low-pass filters and the like ⑦ Various optical elements, e.g. prism, optical waveguide, beam splitter, etc.

⑧ Optical fibers

⑨ Substrates for optical recording media such as optical disks and optical memory cards

EXAMPLES

Other features of the invention will become apparent in the course of the following descriptions of exemplary embodiments which are given for illustration of the invention and are not intended to be limiting thereof. In Examples below, physical properties were measured according to the following methods.

① Number average molecular weight: measured by GPC (relative to standard polystyrene)

② Glass transition temperature: determined by differential scanning calorimeter (under nitrogen, heating rate: 10° C./min).

③ Light transmittance: Specimens shaped by thermopress into 2 mm thick are measured for light transmittance at the wavelength of 400, 600 and 800 nm using a spectrophotometer.

④ Birefringence (retardation): Shaped specimens having a diameter of 40 mm and a thickness of 6 mm are thermopressed into 1 mm thick, and the thus obtained flat disk is measured for birefringence at a location 30 mm distant from its center using a polarizing microscope (wavelength: 589 nm).

⑤ Photoelastic coefficient: Specimens of 10 cm long, 2 cm wide and 2 mm thick formed by thermopress are tested with a light source of helium-neon laser according to the method proposed by Soejima et al (Kobunshi Jikkengaku Vol. 10, p.296 (1983) edited by Kobunshi Jikkengaku Editorial Committee of Kobunshi Gakkai (the Society of Polymer Science, Japan), issued from Kyoritsu, Tokyo)

⑥ Flexural strength: obtained as the flexural stress just when the load determined according to three-point loading test method (JIS K7203, ASTM D790) reaches the maximum value.

⑦ Surface hardness: determined by pencil scratch test according to JIS K 5400. The outline of the procedure is shown below. Specimens shaped by thermopress into 2 mm thick are scratched by pencils with various hardness. The scratching test is conducted with increasing hardness of pencils, and the surface of the specimen is checked visually for any scratch. When a scratch is found out, the hardness code of the pencil is reported as the surface hardness. The order of the hardness codes for pencil is as follows, 9H being the hardest and 6B the softest.

9H, 8H, ..., 2H, H, F, HB, B, 2B, ..., 5B, 6B

⑧ Water absorption at saturation: determined by the weight increase by water absorption of a specimen immersed in distilled water at 23° C. when no further increase in the weight is observed.

⑨ Warping caused by water absorption: Aluminum is deposited to a thickness of 100 nm on a specimen of 10 cm long, 2 cm wide and 2 mm thick. The maximum warp which generates when the piece is immersed in distilled water at 23° C. is reported.

⑩ Resistance to high temperature and humidity: Retentions of the flexural strength and light transmittance at a wavelength of 400 nm of a specimen having been allowed to stand in a bath of constant temperature and humidity at 75° C. and 85% RH for 200 hrs.

EXAMPLE 1

A 100-ml three-necked flask fitted with a stirrer, a nitrogen gas inlet and a distillation head and a condenser was charged with 22.2 g (0.10 mole) of perhydro-2,3-dihydroxymethyl)-1,4:5,8-dimethanonaphthalene, 21.4 g (0.10 mole) of diphenyl carbonate and 0.8 mg (0.10 mmole) of lithium hydride, and the flask was heated with nitrogen gas streaming thereinto to 200° C. in an oil bath and the contents were stirred at the same temperature for 60 minutes. Stirring was continued for 30 minutes at 230° C. and another 30 minutes at 250° C. Then, the system was depressurized to 0.3 mmHg and the contents were stirred for 30 minutes to give 22.0 g of a colorless transparent resin. The elemental analysis of the thus obtained resin revealed: C: 72.77% and H: 7.94% (theoretically C: 72.58% and H: 8.06%). The resin was confirmed to be a polycarbonate obtained by condensation reaction from the facts that 18.75 g (theoretical value: 18.80 g) of phenol had been distilled out and that the number average molecular weight determined by GPC was 37,000. The $^1$H—NMR spectrum (in deuterated chloroform) of the resin is shown in FIG. 1.

Figure 1:
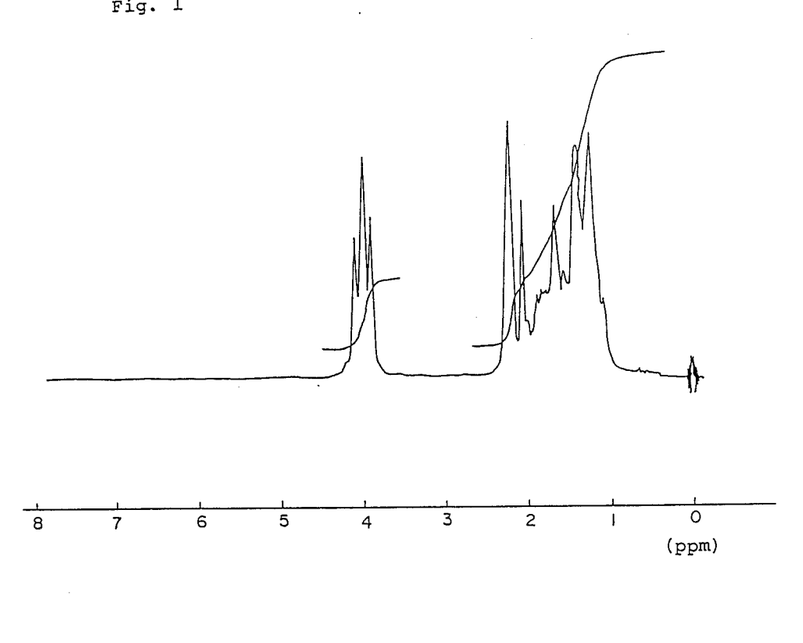
FIG. 1 is the $^1H$—NMR spectrum of the polycarbonate resin obtained in Example 1.

In FIG. 1, absorption by methylene proton bound to carbon atom adjacent to oxygen atom of appears in the range of 3.7 to 4.4 ppm, while absorption by other protons appearing in the range of 0.7 to 2.5 ppm.

Table 2 shows various physical properties of the resin.

EXAMPLES 2 THROUGH 8 AND COMPARATIVE EXAMPLES 1 AND 2

In manners similar to that of Example 1, polycarbonates, polyestercarbonates and polyesters were prepared from various starting compounds. The starting compounds and reaction conditions employed are summarized in Table 1. For all the cases, 0.1 mmole of lithium hydride was used as the catalyst. From elemental analyses and $^1$H—NMR spectra of the resins obtained, it was confirmed that the resins obtained all correspond to the respective starting compounds. Various physical properties of the obtained resins are summarized in Table 2.

COMPARATIVE EXAMPLES 3 AND 4

Various physical properties of a PMMA (Parapet H-1000 made by Kyowa Gas Chemical Industry Co., Ltd.; Comparative Example 3) and PC (panlite AD-5503 made by Teijin Chemicals Ltd.; Comparative Example 4) are shown in Table 2.

As is apparent from Table 2, the resins of the present invention have lower water absorption property than polyesters having similar structures, have superior thermal resistance and water resistance as compared to PMMA and superior surface hardness and higher weather resistance than PC, thus having excellent characteristics as transparent resins.

TABLE 1

| Example or Comparative Example | Starting compounds used | | | Reaction conditions |
|---|---|---|---|---|
| | Compound yielding the structural unit (I) (moles) | Compound yielding the structural unit (IV) (moles) | Compound yielding the structural unit (V) (moles) | |
| Example 2 | norbornane-diCH$_2$OH  0.10 | diphenyl carbonate  0.10 | — | 200° C. × 60 min → 230° C. × 40 min → 250° C. × 40 min → 0.5 mmHg × 20 min → |
| Example 3 | tetracyclic-diCH$_2$OH  0.10 | diphenyl carbonate  0.10 | — | 210° C. × 50 min → 230° C. × 40 min → 250° C. × 60 min → 0.3 mmHg × 20 min → |
| Example 4 | tricyclic-diCH$_2$OH  0.10 | diphenyl carbonate  0.09 | cyclohexane-diphenyl carbonate  0.01 | 200° C. × 60 min → 230° C. × 30 min → 250° C. × 30 min → 0.3 mmHg × 30 min → |
| Example 5 | tricyclic-diCH$_2$OH  0.10 | diphenyl carbonate  0.05 | cyclohexane-diphenyl carbonate  0.05 | 200° C. × 60 min → 230° C. × 40 min → 250° C. × 40 min → 0.3 mmHg × 30 min → |
| Example 6 | norbornane-diCH$_2$OH  0.10 | diphenyl carbonate  0.07 | adamantane-diphenyl carbonate  0.03 | 200° C. × 60 min → 230° C. × 30 min → 260° C. × 30 min → 0.2 mmHg × 40 min → |

TABLE 1-continued

| Example or Comparative Example | Starting compounds used | | Reaction conditions |
|---|---|---|---|
| | Compound yielding the structural unit (I) (moles) | Compound yielding the structural unit (IV) (moles) / Compound yielding the structural unit (V) (moles) | |
| Example 7 |  0.10 |  0.08 /  0.02 | 200° C. × 60 min → 230° C. × 40 min → 260° C. × 30 min → 0.2 mmHg × 30 min → |
| Example 8 |  0.10 |  0.07 /  0.03 | 200° C. × 60 min → 230° C. × 50 min → 260° C. × 30 min → 0.3 mmHg × 20 min → |
| Comparative Example 1 |  0.10 | — /  0.10 | 200° C. × 60 min → 230° C. × 40 min → 250° C. × 40 min → 0.3 mmHg × 30 min → |
| Comparative Example 2 |  0.10 | — /  0.10 | 200° C. × 60 min → 230° C. × 50 min → 260° C. × 30 min → 0.2 mmHg × 20 min → |

TABLE 2

| Example or Comparative Example | Number average molecular weight | Glass transition temperature [°C.] | Light transmittance [%] | | | Retardation [nm] | Flexural strength [kg/cm²] | Surface hardness | Water absorption at saturation [%] | Warping caused by water absorption [mm] | Resistance to high temperature and high humidity | |
|---|---|---|---|---|---|---|---|---|---|---|---|---|
| | | | 400 nm | 600 nm | 800 nm | | | | | | Retention of flexural strength [%] | Retention of light transmittance [%] |
| Ex. 1 | 37,000 | 125 | 87 | 89 | 91 | 3 | 760 | 2H | 0.20 | <0.1 | 98 | 100 |
| Ex. 2 | 33,000 | 112 | 86 | 90 | 90 | 5 | 740 | 2H | 0.22 | <0.1 | 97 | 100 |
| Ex. 3 | 39,000 | 160 | 88 | 90 | 91 | 3 | 710 | 3H | 0.17 | <0.1 | 95 | 100 |
| Ex. 4 | 29,000 | 130 | 88 | 90 | 92 | 4 | 780 | 2H | 0.21 | <0.1 | 95 | 100 |
| Ex. 5 | 30,000 | 128 | 88 | 89 | 90 | 4 | 770 | 2H | 0.28 | <0.1 | 96 | 100 |
| Ex. 6 | 24,000 | 127 | 82 | 89 | 91 | 6 | 790 | 3H | 0.22 | <0.1 | 96 | 100 |
| Ex. 7 | 31,000 | 124 | 84 | 86 | 89 | 5 | 710 | 2H | 0.20 | <0.1 | 92 | 100 |
| Ex. 8 | 27,000 | 137 | 87 | 89 | 90 | 12 | 800 | 2H | 0.24 | 0.1 | 96 | 100 |
| Comp. Ex. 1 | 36,000 | 124 | 87 | 88 | 90 | 5 | 700 | 2H | 0.60 | 0.2 | 95 | 100 |
| Comp. Ex. 2 | 28,000 | 144 | 85 | 89 | 90 | 22 | 800 | 2H | 0.58 | 0.1 | 90 | 97 |
| Comp. Ex. 3 | 24,000 | 97 | 91 | 92 | 92 | 3 | 670 | 4H | 2.2 | 1.0 | 80 | 100 |
| Comp. Ex. 4 | 13,000 | 137 | 87 | 88 | 90 | 25 | 1,040 | B | 0.40 | 0.1 | 47 | 100 |

EXAMPLE 9

A 100-ml three-necked flask fitted with a stirrer, a nitrogen gas inlet and a distillation head and a condenser was charged with 7.20 g (0.05 mole) of 2,2,4,4-tetramethyl-1,3-cyclobutanediol, 11.1 g (0.05 mole) of perhydro-2,3-di(hydroxymethyl)-1,4:5,8-dimethanonaphthalene, 21.4 g (0.10 mole) of diphenyl carbonate and 0.8 mg (0.10 mmole) of lithium hydride, and the flask was heated with nitrogen gas streaming thereinto to 200° C. in an oil bath and the contents were stirred at the same temperature for 50 minutes. Stirring was continued for 30 minutes at 230° C. and another 30 minutes at 250° C. Then, the system was depressurized to 0.5 mmHg and the contents were stirred for 10 minutes to give 19.2 g of a transparent light yellow resin. The elemental analysis of the thus obtained resin revealed: C: 68.62% and H: 8.09% (theoretically C: 68.90% and H: 8.13%). The resin was confirmed to be a polycarbonate obtained by condensation reaction from the facts that 18.68 g (theoretical value: 18.80 g) of phenol had been distilled out and that the number average molecular weight determined by GPC was 25,000. The ¹H—NMR spectrum (in deuterated chloroform) of the resin is shown in FIG. 2.

Figure 2:
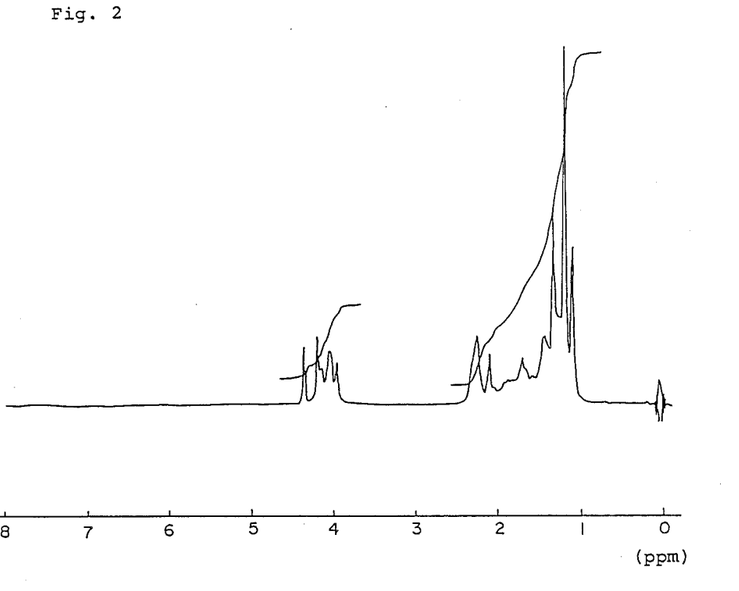
FIG. 2 is the $^1H$—NMR spectrum of the polycarbonate resin obtained in Example 9.

In FIG. 2, absorption by methyne proton of and by methylene proton bound to carbon atom adjacent to oxygen atom of appear in the range of 3.7 to 4.4 ppm, while absorption by other protons appearing in the range of 0.9 to 2.5 ppm.

Table 4 shows various physical characteristics of the resin.

EXAMPLES 10 THROUGH 12 AND COMPARATIVE 5 AND 6

In manners similar to that of Example 9, polycarbonates and polyestercarbonates were prepared from various starting compounds. The starting compounds and reaction conditions employed are summarized in Table 3. For all the cases, 0.1 mmole of lithium hydride was used as the catalyst. The structures of the resins obtained were confirmed by elemental analyses and ¹H—NMR spectra. Various physical properties are summarized in Table 4.

As is apparent from Table 4, the resins of the present invention have very low water absorption property and excellent characteristics as transparent resin.

TABLE 3

| Example or Comparative Example | Starting compounds | | | Reaction conditions |
|---|---|---|---|---|
| | 2,2,4,4-Tetramethyl-1,3-cyclobutanediol (moles) | Compound yielding the structural unit (I) (moles) | Compound yielding the structural unit (II) (moles) | |
| Example 10 | 0.02 |  0.08 | 200° C. × 50 min → 230° C. × 30 min → 250° C. × 30 min → 0.5 mmHg × 15 min |

TABLE 3-continued

| Example or Comparative Example | Starting compounds | | | Reaction conditions |
|---|---|---|---|---|
| | 2,2,4-Tetramethyl-1,3-cyclobutanediol (moles) | Compound yielding the structural unit (I) (moles) | Compound yielding the structural unit (II) (moles) | |
| Example 11 | 0.08 | [norbornane-CH2OH/CH2OH] 0.02 | [diphenyl carbonate] 0.10 | 200° C. × 60 min → 230° C. × 30 min → 250° C. × 30 min → 0.3 mmHg × 10 min |
| Example 12 | 0.06 | [perhydrodimethanonaphthalene-CH2OH/CH2OH] 0.04 | [diphenyl carbonate] 0.10 | 200° C. × 60 min → 230° C. × 40 min → 250° C. × 40 min → 0.5 mmHg × 15 min |
| Comparative Example 5 | 0.10 | — | [diphenyl carbonate] 0.10 | 200° C. × 50 min → 230° C. × 40 min → 270° C. × 30 min → 0.5 mmHg × 20 min |
| Comparative Example 6 | — | [perhydrodimethanonaphthalene-CH2OH/CH2OH] 0.10 | [diphenyl carbonate] 0.10 | 200° C. × 50 min → 230° C. × 30 min → 250° C. × 30 min → 0.4 mmHg × 20 min |

TABLE 4

| Example or Comparative Example | Number average molecular weight | Glass transition temperature [°C.] | Light transmittance [%] | | | Retardation [nm] | Photoelastic coefficient [10⁻¹³cm²/dyne] | Flexural strength [kg/cm²] | Surface hardness | water absorption at saturation [%] | Warping caused by water absorption [mm] | Resistance to high temperature and high humidity | |
|---|---|---|---|---|---|---|---|---|---|---|---|---|---|
| | | | 400 nm | 600 nm | 800 nm | | | | | | | Retention of flexural strength [%] | Retention of light transmittance [%] |
| Comparative* Example 5 | 17,000 | 132 | 78 | 84 | 90 | 6 | −10.2 | 700 | H | 0.33 | 0.1 | 98 | 100 |
| Example 9 | 25,000 | 135 | 82 | 90 | 92 | 4 | −6.0 | 720 | 2H | 0.22 | <0.1 | 98 | 100 |
| Example 10 | 27,000 | 138 | 86 | 90 | 92 | 3 | −3.1 | 700 | 2H | 0.20 | <0.1 | 95 | 100 |
| Comparative Example 6 | 30,000 | 128 | 84 | 89 | 91 | 5 | −5.6 | 660 | 2H | 0.23 | <0.1 | 92 | 98 |
| Example 11 | 34,000 | 120 | 81 | 88 | 91 | 5 | −9.4 | 770 | 2H | 0.27 | <0.1 | 100 | 100 |
| Example 12 | 30,000 | 166 | 82 | 89 | 91 | 4 | −10.2 | 730 | 3H | 0.18 | <0.1 | 97 | 100 |

*turned white turbid and completely opaque by heat treatment at 190° C. for 30 minutes.

EXAMPLE 13

A 1-liter three-necked flask fitted with a stirrer, a nitrogen gas inlet and a distillation head and a condenser was charged with 58 g (0.2 mole) of 1,1-di(4-hydroxyphenyl)-1-phenylethane (Bis-Ap), 178 g (0.8 mole) of perhydro-2,3-di(hydroxyphenyl)-1,4:5,8-dimethanonaphthalene, 214 g (1.0 mole) of diphenyl carbonate and 8.0 mg (1.0 mmole) of lithium hydride, and the flask was heated with nitrogen gas streaming thereinto to 200° C. in an oil bath and the contents were stirred at the same temperature for 30 minutes. Stirring was continued for 40 minutes at 230° C. and another 80 minutes at 250° C. Then, the system was depressurized to 2 mmHg and the contents were stirred for 60 minutes to give 239 g of a transparent light brown resin. The $^1$H—NMR spectrum (90 MHz, in deuterated chloroform) of the resin is shown below, wherein figures in brackets show relative absorption intensities.

0.8 to 2.4 ppm: proton of perhydrodimethanonaphthalene skeleton and proton of the methyl group of Bis-Ap [67]
3.7 to 4.3 ppm: proton of —OCH$_2$—[16]
6.9 to 7.6 ppm: proton of aromatic ring [15]

Table 6 shows various physical properties measured on the resin.

EXAMPLES 14 THROUGH 17

Example 13 was repeated except for changing the starting compounds and/or amounts thereof charged to obtain various resins. The starting compounds and the amounts thereof charged are summarized in Table 5.

TABLE 5

| Example | Upper: starting compound yielding structural unit (III) Lower: starting compound yielding structural unit (I) | | Upper: starting compound yielding structural unit (IV) Lower: starting compound yielding structural unit (V) | |
|---|---|---|---|---|
| | Compound | Moles charged | Compound | Moles charged |
| 14 | 1,1-di(4-hydroxyphenyl)-1-phenylethane | 0.4 | diphenyl carbonate | 1.0 |
| | perhydro-dimethanonaphthalene-dimethanol | 0.6 | — | 0 |
| 15 | 1,1-di(4-hydroxyphenyl)-1-phenylethane | 0.3 | diphenyl carbonate | 0.6 |
| | perhydro-dimethanonaphthalene-dimethanol | 0.7 | diphenyl cyclohexane-1,4-dicarboxylate | 0.4 |
| 16 | 1,1-di(4-hydroxyphenyl)-1-phenylethane | 0.3 | diphenyl carbonate | 0.7 |
| | perhydro-tri-methanoanthracene-dimethanol | 0.7 | diphenyl glutarate | 0.3 |
| 17 | 1,1,1-tri(4-hydroxyphenyl)-1-phenylmethane | 0.2 | diphenyl carbonate | 0.7 |
| | perhydro-dimethanonaphthalene-dimethanol | 0.8 | diphenyl cyclohexane-1,4-dicarboxylate | 0.3 |

Various characteristics measured on the resins obtained in Examples 14 through 17 are shown in Table 6. Similarly, characteristics of a polycarbonate obtained from 1,1-di(4-hydroxyphenyl)-1-phenylethane (Comparative Example 7) and a polycarbonate obtained by the use of equimolar amounts of perhydro-2,3-di(hydroxymethyl)-1,4:5,8-dimethanonaphthalene and bisphenol A as hydroxyl compounds (Comparative Example 8) are shown.

TABLE 6

| Example or Comparative Example | Number average molecular weight | Glass transition temperature [°C] | Light transmittance [%] 400 nm | Light transmittance [%] 600 nm | Light transmittance [%] 800 nm | Photoelastic coefficient [$10^{-13}$cm$^2$/dyne] | Surface hardness | Water absorption at saturation [%] | Warping caused by water absorption [mm] |
|---|---|---|---|---|---|---|---|---|---|
| Example 13 | 24,000 | 141 | 85 | 89 | 91 | −17 | 2H | 0.34 | <0.1 |
| Example 14 | 21,000 | 152 | 87 | 89 | 91 | −30 | 3H | 0.30 | <0.1 |
| Example 15 | 36,000 | 147 | 86 | 90 | 92 | −33 | 3H | 0.36 | <0.1 |
| Example 16 | 19,000 | 164 | 84 | 89 | 90 | −20 | 3H | 0.24 | <0.1 |
| Example 17 | 17,000 | 153 | 83 | 88 | 91 | −19 | 3H | 0.34 | <0.1 |
| Comparative Example 7 | 16,000 | 170 | 76 | 87 | 90 | −66 | 3H | 0.37 | <0.1 |
| Comparative Example 8 | 19,000 | 135 | 85 | 88 | 90 | −45 | 2H | 0.35 | <0.1 |

EXAMPLES 18 AND 19

Example 13 was repeated except for using instead of 214 g of diphenyl carbonate a mixture of 107 g (0.5 mole) of diphenyl carbonate and 188 g (0.5 mole) of octahydro-4,7-methanoindenedicarboxylic acid diphenyl ester (mixture of various isomers), and a mixture of 107 g (0.5 mole) of diphenyl carbonate and 221 g (0.5 mole) of dodecahydro-1,4:5,8-dimethanofluolenedicarboxylic acid diphenyl ester (mixture of various isomers) to obtain corresponding polyestercarbonate resins.

The thus obtained resins both show glass transition temperatures higher than 135° C., thus showing high thermal resistance, and are also excellent in other characteristics.

Obviously, numerous modifications and variations of the present invention are possible in light of the above teachings. It is therefore to be understood that within the scope of the appended claims, the invention may be practiced otherwise than as specifically described herein.

We claim:

1. A polycarbonate or polyestercarbonate resin having a number average molecular weight of 10,000 to 100,000 and comprising structural units represented by the following formulae (I), (IV) and (V) or comprising these units and structural units represented by the following formula (II) or (III), the molar fraction of the structural unit (I) or the sum of molar fractions of the structural unit (I) and the structural unit (II) or (III) being substantially the same as the sum of molar fractions of the structural units (IV) and (V), the molar fraction of the structural unit (II) or (III) being 5 to 45 mol % and the molar fraction of the structural unit (IV) being 20 to 50 mol %:

wherein n is 0, 1 or 2, (II)

(III)

wherein A is an alkyl group or a phenyl group, (IV)

and (V)

wherein B is a divalent saturated aliphatic hydrocarbon group, saturated alicyclic hydrocarbon group or aromatic hydrocarbon group.

2. A polycarbonate or polyestercarbonate resin having a number average molecular weight of 10,000 to 100,000 and comprising structural units represented by the following formulae (I), (IV) and (V), the molar fraction of the structural unit (I) being substantially the same as the sum of molar fractions of the structural units (IV) and (V), and the molar fraction of the structural unit (IV) being 20 to 50 mol %:

(I)

-continued
wherein n is 0, 1 or 2, and (V)

wherein B is a divalent saturated aliphatic hydrocarbon group, saturated alicyclic hydrocarbon group or aromatic hydrocarbon group.

3. The polycarbonate or polyestercarbonate resin according to claim 2 wherein the molar fraction of structural unit (IV) is 30 to 50 mol %.

4. The polycarbonate or polyestercarbonate resin according to claim 2 wherein the molar fraction of structural unit (IV) is 40 to 50 mol %.

5. The polycarbonate or polyestercarbonate resin according to claim 2 wherein B of structural unit (V) is a divalent saturated alicyclic hydrocarbon having not more than 20 carbon atoms.

6. The polycarbonate or polyestercarbonate resin according to claim 2 wherein n of structural unit (I) is 1.

7. A polycarbonate resin having a number average molecular weight of 10,000 to 100,000 and comprising structural units represented by the following formulae (I), (II) and (IV), the sum of molar fractions of the structural units (I) and (II) being substantially the same as the molar fraction of the structural unit (IV), and the molar fraction of the structural unit (II) being 5 to 45 mol %:

(I)

wherein n is 0, 1 or 2,

, and (II)

, and (IV)

8. The polycarbonate resin according to claim 7 wherein the molar fraction of structural unit (II) is 10 to 40 mol %.

9. The polycarbonate resin according to claim 7 wherein n of structural unit (I) is 1.

10. A polycarbonate or polyestercarbonate resin having a number average molecular weight of 10,000 to 100,000 and comprising structural units represented by the following formulae (I), (III), (IV) and (V), the sum of molar fractions of the structural units (I) and (III) being substantially the same as the sum of molar fractions of the structural units (IV) and (V), the molar fraction of the structural unit (III) being 5 to 45 mol % and the molar fraction of the structural unit (IV) being 20 to 50 mol %:

(I)

wherein n is 0, 1 or 2, (III)

wherein A is an alkyl group or a phenyl group,

, and (IV)

(V)

wherein B is a divalent saturated aliphatic hydrocarbon group, saturated alicyclic hydrocarbon group or aromatic hydrocarbon group.

11. The polycarbonate or polyestercarbonate resin according to claim 10 which has a photoelastic coefficient at 25° C. of not more than $40 \times 10^{-13}$ cm²/dyne in absolute value.

* * * * *

UNITED STATES PATENT AND TRADEMARK OFFICE
CERTIFICATE OF CORRECTION

PATENT NO. :    4,950,736
DATED      :    AUGUST 21, 1990
INVENTOR(S) :   SHIGERU SASAKI ET AL.

It is certified that error appears in the above-identified patent and that said Letters Patent is hereby corrected as shown below:

On the title page and the title above column 1, please delete "BICYCLOL POLYCYCLO" and insert --BICYCLO/POLYCYCLO--.

Signed and Sealed this

Tenth Day of December, 1991

Attest:

HARRY F. MANBECK, JR.

Attesting Officer        Commissioner of Patents and Trademarks